(12) United States Patent
Mizumura

(10) Patent No.: US 7,522,829 B2
(45) Date of Patent: Apr. 21, 2009

(54) CAMERA SYSTEM

(75) Inventor: Hiroshi Mizumura, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 309 days.

(21) Appl. No.: 11/523,639

(22) Filed: Sep. 20, 2006

(65) Prior Publication Data

US 2007/0065133 A1 Mar. 22, 2007

(30) Foreign Application Priority Data

Sep. 21, 2005 (JP) .............................. 2005-274112

(51) Int. Cl.
*G03B 3/00* (2006.01)
(52) U.S. Cl. ........................... 396/137; 396/90; 396/55; 348/208.99; 348/E5.046
(58) Field of Classification Search ................ 396/137, 396/77, 79–82, 85, 89–93, 102–104, 52–55, 396/95; 348/208.99, 208.4, 208.11, 208.12, 348/E5.046

See application file for complete search history.

(56) References Cited

U.S. PATENT DOCUMENTS 5,140,357 A 8/1992 Suda et al.

FOREIGN PATENT DOCUMENTS

| EP | 0 756 187 A2 | 1/1997 |
|----|----|----|
| EP | 1 722 259 A1 | 11/2006 |
| JP | 05-107451 A | 4/1993 |
| JP | 5-107451 A | 4/1993 |
| WO | WO-2005/085927 A1 | 9/2005 |

*Primary Examiner*—Reena Aurora
(74) *Attorney, Agent, or Firm*—Birch, Stewart, Kolasch & Birch, LLP

(57) ABSTRACT

A camera system including an imaging optical system including a focus lens, a driving device which drives the focus lens, a moving speed command value input device which inputs a moving speed command value of the focus lens, a wobble amount calculating device which calculates a wobble amount for wobbling the focus lens, a moving amount command value calculating device which calculates a command value of an amount of movement of the focus lens per unit time based on the inputted moving speed command value, a moving amount maximum value calculating device which calculates a maximum value of the amount of movement of the focus lens per unit time in consideration of the wobble amount, a moving amount determining device which sets, when the command value is larger than or equal to the maximum value, the maximum value as the amount of movement of the focus lens per unit time.

2 Claims, 5 Drawing Sheets

CAMERA SYSTEM

BACKGROUND OF THE INVENTION

1. Field of the Invention

The present invention relates to a camera system and particularly relates to art used for detecting focus in autofocus control of a taking lens.

2. Description of the Related Art

Conventionally, arts for detecting the best focus position through wobbling are proposed. For example, Japanese Patent Application Laid-Open No. 5-107451 discloses an autofocus device which moves, during zooming of an inner focus lens, the focus lens along a tracking curve and performs tracking in a wide-angle area with a large focal depth by detecting the best focus through wobbling.

In the case where the focus lens is driven in response to a wobbling command from a control unit of a camera and a moving speed command of the focus lens, a too large speed command value disables a correct wobbling operation, resulting in an erroneous decision of the best focus direction (in-focus direction).

The present invention is designed in view of these circumstances. An object of the present invention is to provide a camera system which can enable a correct wobbling operation and accurately decide the best focus direction when driving a focus lens in response to a wobbling command and a moving speed command of the focus lens.

SUMMARY OF THE INVENTION

In order to attain the object, a camera system according to a first aspect of the present invention comprises: an imaging optical system including a focus lens, a driving device which drives the focus lens, a moving speed command value input device which inputs a moving speed command value of the focus lens, a wobble amount calculating device which calculates a wobble amount for wobbling the focus lens, a moving amount command value calculating device which calculates a command value of the amount of movement of the focus lens per unit time based on the inputted moving speed command value, a moving amount maximum value calculating device which calculates the maximum value of the amount of movement of the focus lens per unit time in consideration of the wobble amount, a moving amount determining device which sets, when the command value is larger than or equal to the maximum value, the maximum value as the amount of movement of the focus lens per unit time, and sets, when the command value is smaller than the maximum value, the command value as the amount of movement of the focus lens per unit time, a focus position command value calculating device which calculates a focus position command value based on the determined amount of movement of the focus lens per unit time, a best focus direction detecting device which detects the best focus direction when the focus lens is driven to the position of the focus position command value by the driving device while wobbling, and a control device which moves the focus lens to the best focus position based on the detected best focus direction.

According to the camera system of the first aspect, the maximum value of the amount of movement of the focus lens per unit time is set according to the wobble amount, so that a correct wobbling operation can be performed and the best focus direction can be correctly determined.

A camera system according to a second aspect of the present invention, in the first aspect, further comprises: a focal depth calculating device which calculates the focal depth of the imaging optical system, wherein the wobbling amount calculating device calculates the wobble amount based on the focal depth.

According to the camera system of the second aspect, defocusing can be prevented during the movement of the focus lens by, for example, making the wobble amount smaller than the focal depth, so that an unnatural image can be prevented.

According to the present invention, the maximum value of the amount of movement of the focus lens per unit time is set according to the wobble amount, so that a correct wobbling operation can be performed and the best focus direction can be correctly determined.

DETAILED DESCRIPTION OF THE PREFERRED EMBODIMENTS

The following will describe a preferred embodiment of a camera system of the present invention in accordance with the accompanying drawings.

Figure 1:
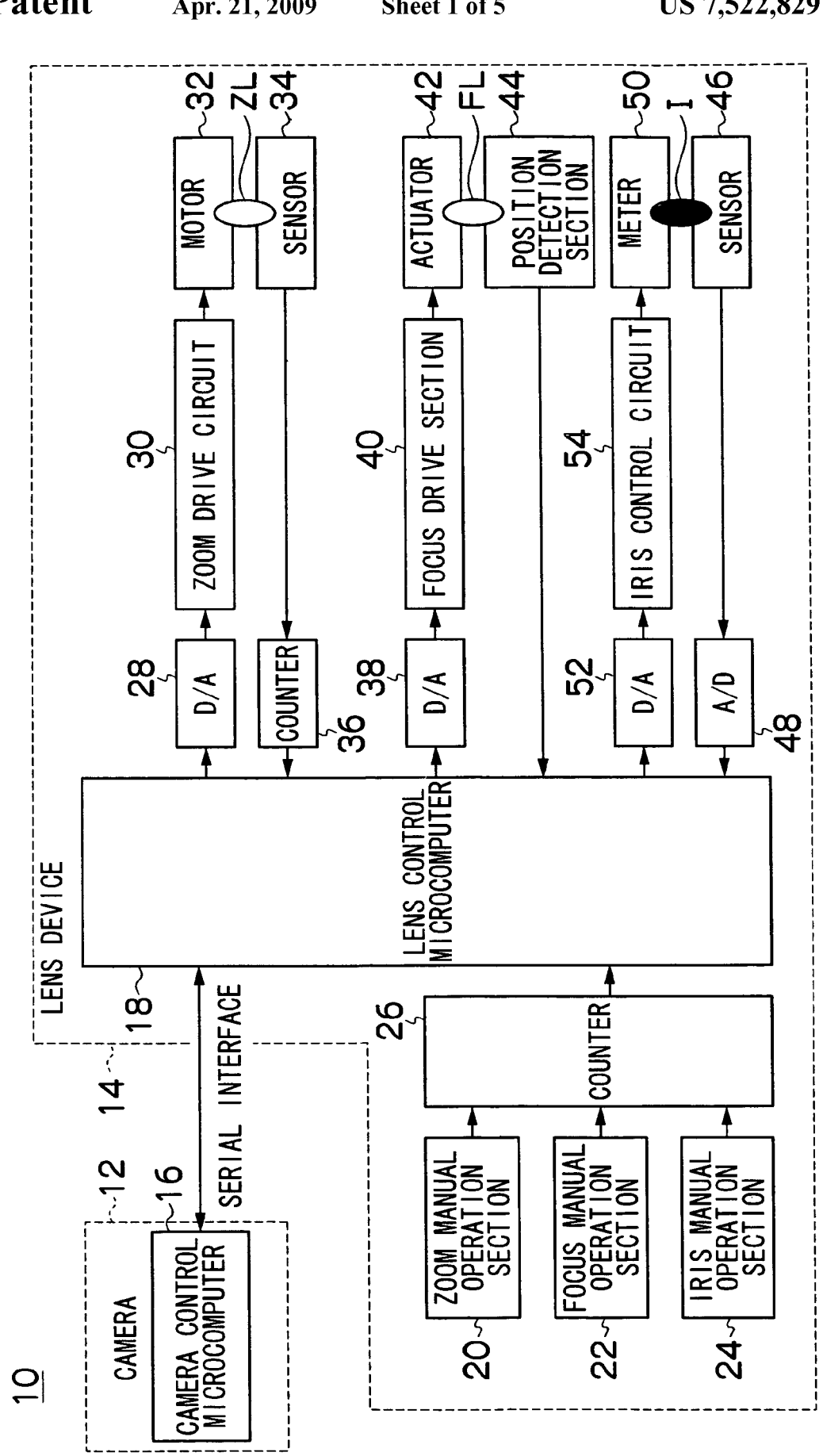
FIG. 1 is a block diagram showing the main configuration of a control system in a camera system according to an embodiment of the present invention.

FIG. 1 is a block diagram showing the main configuration of a control system in the camera system according to the embodiment of the present invention. As shown in FIG. 1, a camera system 10 comprises a camera 12 and a lens device 14.

A camera control microcomputer 16 in the camera 12 comprises ROM for storing a control program and kinds of data tables necessary for control and operation and RAM or the like used as a working storage area, and the microcomputer 16 controls devices in the camera 12 according to predetermined programs. A lens control microcomputer 18 in the lens device 14 comprises ROM for storing a control program and kinds of data tables necessary for control and operation and RAM or the like used as a working storage area, and the microcomputer 18 controls devices in the lens device 14 according to predetermined programs. The camera control microcomputer 16 and the lens control microcomputer 18 are serially connected to each other via a serial interface (SCI) of the lens device 14.

As shown in FIG. 1, the lens device 14 comprises a zoom manual operation section 20, a focus manual operation section 22, and an iris manual operation section 24 which manually operate zoom, focus, and an iris.

The zoom manual operation section 20 is, for example, a zoom ring which is rotatably attached on the outer periphery of the lens device 14. The direction and amount of rotation of the zoom ring are converted, by a counter 26, to zoom demand data for providing an instruction on the moving speed of zoom lenses ZL, and the data is outputted to the lens control microcomputer 18. The lens control microcomputer 18 calculates the amounts of movement or the like of the zoom lenses ZL based on the zoom demand data obtained from the counter 26 and position data on the zoom lenses ZL. The position data has been inputted from a sensor 34 through a counter 36. The lens control microcomputer 18 outputs a zoom control signal including data on the amounts of movement of the zoom lenses ZL. The amounts of movement have been obtained by operation. The zoom control signal is converted to an analog signal by a DA converter 28 and outputted to a zoom drive circuit 30. The zoom drive circuit 30 controls a zoom motor 32 in response to the zoom control signal to drive the zoom lenses ZL of the lens device 14.

The focus manual operation section 22 is, for example, a focus ring attached on the outer periphery of the lens device 14. The direction and amount of rotation of the focus ring are converted, by the counter 26, to focus demand data (local position command LP) for providing an instruction on the moving positions of focus lenses FL, and the data is outputted to the lens control microcomputer 18. The lens control microcomputer 18 outputs a focus control signal based on the focus demand data. The focus control signal is converted to an analog signal by a DA converter 38 and outputted to a focus drive section 40. The focus drive section 40 controls an actuator 42 based on the focus control signal and the positions of focus lenses FL to drive the focus lenses FL. The positions of the focus lenses FL have been detected by a position detection section 44.

A sensor 46 for iris I outputs F number data to the lens control microcomputer 18. The F number data is converted to a digital signal by an AD converter 48 and inputted to the lens control microcomputer 18. The lens control microcomputer 18 calculates the amount of drive of a meter 50 based on the F number data and an iris control signal inputted from the iris manual operation section 24 through the counter 26, and the lens control microcomputer 18 outputs an iris control signal including data on the amount of drive. The iris control signal is converted to an analog signal by a DA converter 52 and outputted to an iris control circuit 54. The F number data obtained by the sensor 46 for iris I may be inputted to the iris control circuit 54 and the amount of drive of the meter 50 may be calculated by the iris control circuit 54.

Figure 2:
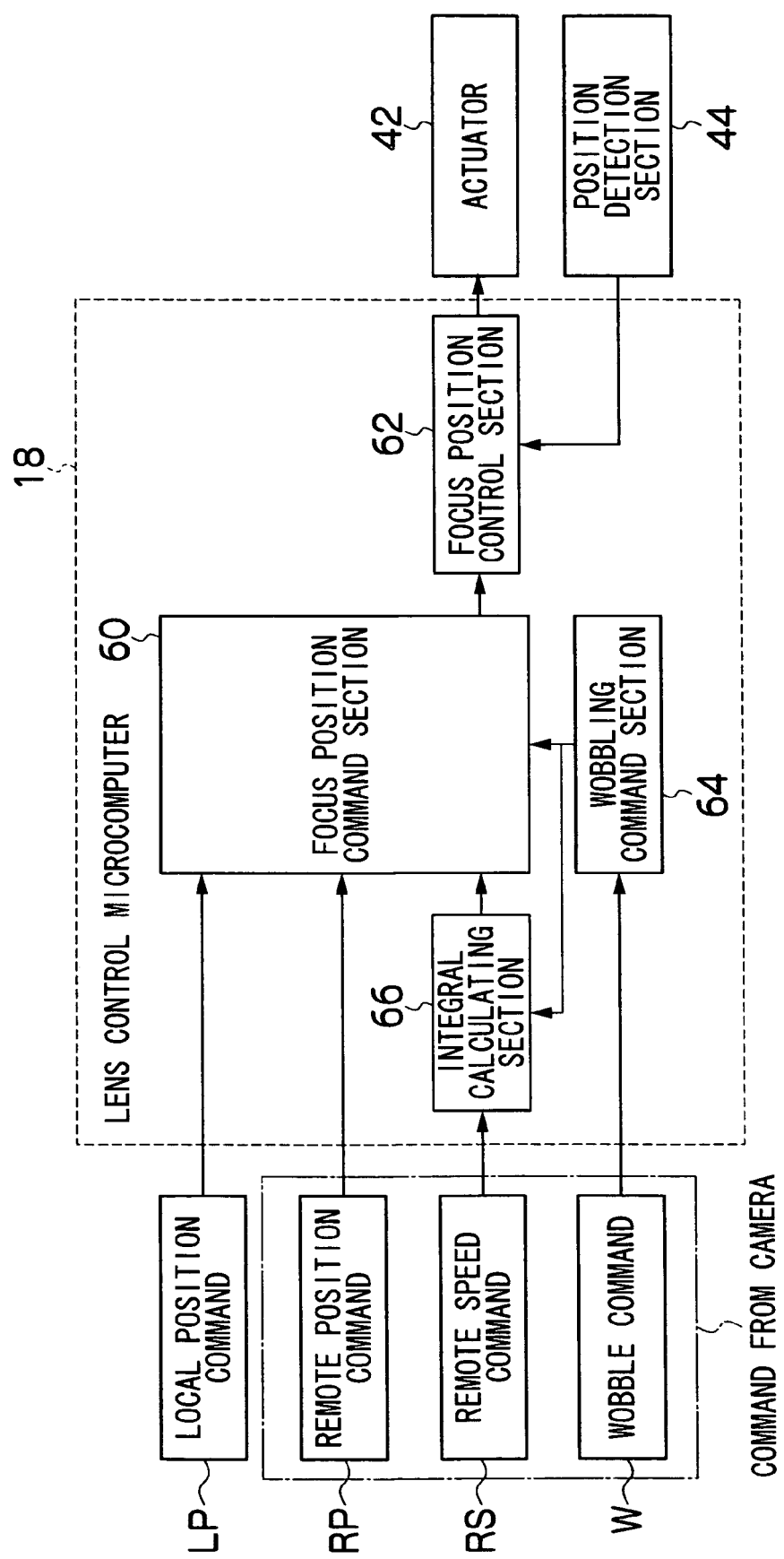
FIG. 2 is a block diagram showing the main configuration of a focus control mechanism of a camera system 10.

FIG. 2 is a block diagram showing the main configuration of the focus control mechanism of the camera system 10. In the camera system 10 of the present embodiment, focus control of the lens device 14 is performed in response to a manual operation from the focus manual operation section 22 or a remote command from the camera 12.

First, the following will describe focus control through a manual operation. When the focus manual operation section 22 (focus ring) is operated, the direction and amount of rotation of the focus manual operation section 22 are converted, by the counter 26, to focus demand data (local position command LPCtrl) for providing an instruction on the moving positions of focus lenses FL, and the data is outputted to the lens control microcomputer 18. A focus position command section 60 calculates moving target positions of the focus lenses FL in response to the local position command LP, and outputs the positions to a focus position control section 62. Then, the focus position control section 62 calculates the amounts of movement or the like of the focus lenses FL based on the moving target positions and position data on the focus lenses FL, the position data being inputted from the position detection section 44. After that, the focus position control section 62 outputs a focus control signal including the data on the amounts of movement to the focus drive section 40 (not shown in FIG. 2). Thus the focus lenses FL are driven and moved to the moving target positions.

The following will describe focus control responding to a remote position command RP from the camera 12. First, the lens control microcomputer 18 calculates a focal depth d of the lens device 14. The focal depth d is expressed as below:

$$d = 2 \times \delta \times Fno \quad (1)$$

where δ designates the radius of the minimum circle of confusion of the lens device 14 and Fno designates F number.

Then, a wobbling command section 64 obtains a wobble movement amount command value WobCtrl from a Wobble command W inputted from the camera 12. Based on the wobble movement amount command value WobCtrl obtained from the camera 12 and the calculated focal depth d, a wobble amount Wob is calculated. The wobble amount Wob is, for example, a times as large as the focal depth d as below:

$$Wob = \alpha \times d \quad (2)$$

The coefficient α is preferably within the range of 0<|α|<1. For example, the coefficient α is ±1/4. The coefficient α is set within the range of 0<|α|<1 because generally the wobble amount Wob smaller than or equal to the focal depth d is not visible in an image with a wobbling operation. The smaller wobble amount Wob, the more visually natural image is obtained. However, it becomes difficult to detect the best focus direction, and thus the coefficient α is set within a range that enables detection of the best focus direction with ease. As expressed in Equation (1), the focal depth d changes with the F number Fno, and thus the wobble amount Wob also changes with the F number Fno.

Then, the focus position command section 60 calculates a focus position command value FPCtrl in response to the remote position command RP inputted from the camera 12. After that, the wobble amount Wob is added to the focus position command value FPCtrl to calculate a focus position command value FPCtrlOP as follows:

$$FPCtrlOP = FPCtrl + Wob \quad (3)$$

Then, the focus position control section 62 calculates the amounts of movement or the like of the focus lenses FL based on the focus position command value FPCtrlOP and position data on the focus lenses FL, the position data being inputted from the position detection section 44. After that, the focus position control section 62 outputs a focus control signal including the data on the amounts of movement to the focus drive section 40. The focus lenses FL are driven by the focus drive section 40 and wobbled around the focus position command value FPCtrl by |Wob|. Thus the best focus position is detected by the camera control microcomputer 16 and the focus lenses FL are moved to the best focus position.

The following will describe focus control responding to a remote speed command RS from the camera 12. First, the lens control microcomputer 18 calculates the focal depth d of the lens device 14 according to Equation (1). Further, the wobbling command section 64 obtains the wobble movement amount command value WobCtrl from the Wobble command W inputted from the camera 12 and calculates the wobble amount Wob according to Equation (2).

Then, from the remote speed command RS inputted from the camera 12, the lens control microcomputer 18 obtains a command to move the focus lenses FL at a speed AFSpeedCtrl which is α times as large as the focal depth d per unit time. After that, an integral calculating section 66 integrates the speed AFSpeedCtrl to calculate a movement amount command value LAFSCtrl of the focus lenses FL per unit time (for example, 1 ms).

Then, the focus position command section 60 calculates the maximum value AFSCtrlMax of the amounts of movement of the focus lenses FL per unit time in consideration of the calculated wobble amount Wob. In this case, the maximum value AFSCtrlMax is determined based on the limit value of the moving speed when the focus lenses FL are moved while wobbling with the wobble amount Wob, and the maximum value AFSCtrlMax of the amounts of movement of the focus lenses FL per unit time is stored, for each value of the wobble amount Wob, in the memory (RAM or the like) of the lens control microcomputer 18. The focus position command section 60 refers to the memory to calculate the maximum value AFSCtrlMax.

Then, based on the command value LAFSCtrl and the maximum value AFSCtrlMax, a moving amount PAFSCtrl of the focus lenses FL is calculated per unit time is calculated. When the command value LAFSCtrl is larger than or equal to the maximum value AFSCtrlMax (LAFSCtrl≧AFSCtrlMax), PAFSCtrl=AFSCtrlMax is established. When the command value LAFSCtrl is smaller than the maximum value AFSCtrlMax (LAFSCtrl<AFSCtrlMax), PAFSCtrl=LAFSCtrl is established.

Then, the moving amount PAFSCtrl is added to the focus position command value AFSCtrl of the previous processing (or the initial positions of the focus lenses FL at the first processing) as follows:

$$AFSCtrl = AFSCtrl + PAFSCtrl \tag{4}$$

Thereafter, the wobble amount Wob is added to the value of AFSCtrl having been obtained by Equation (4), so that a focus position command value FPCtrlOP is calculated in consideration of the wobble amount Wob as follows:

$$FPCtrlOP = AFSCtrl + Wob \tag{5}$$

Then, the focus position control section 62 calculates the amounts of movement or the like of the focus lenses FL based on the focus position command value FPCtrlOP and position data on the focus lenses FL, the position data being inputted from the position detection section 44. After that, the focus position control section 62 outputs a focus control signal including the data on the amounts of movement to the focus drive section 40. The focus lenses FL are driven by the focus drive section 40 and wobbled around the focus position command value FPCtrl by |Wob|. Thus the best focus position is detected by the camera control microcomputer 16 and the focus lenses FL are moved to the best focus position.

Figure 3:
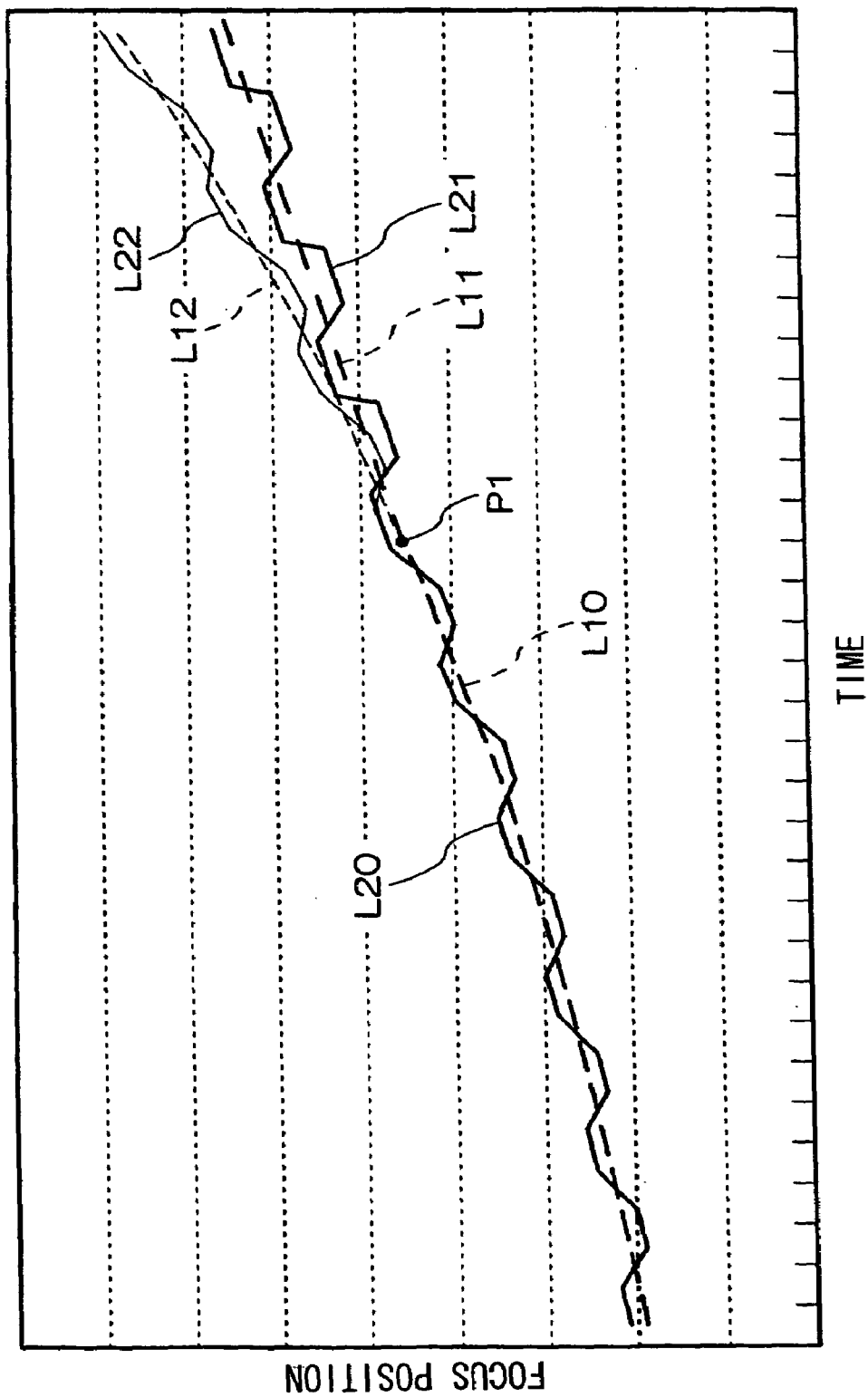
FIG. 3 is a graph schematically showing changes in the positions of focus lenses FL.

FIG. 3 is a graph schematically showing changes in the positions of the focus lenses FL. Broken line L10 of FIG. 3 is a plot of the added moving amounts PAFSCtrl of the focus lenses FL per unit time. The inclination of the broken line L10 corresponds to the moving amount PAFSCtrl. Further, solid line L20 is a plot of the movements of the focus lenses FL which move while wobbling.

As the speed command value AFSpeedCtrl of the remote speed command RS increases, the moving amount command value AFSCtrl of the focus lenses FL increases, so that the plot L10 inclines more sharply as indicated by thin broken line L12. For this reason, as indicated by solid line L22, a higher speed is demanded of the wobbling operation and thus it becomes difficult to perform a correct wobbling operation.

In the present embodiment, when the command value AFSCtrl is larger than or equal to the maximum value AFSCtrlMax, the moving amount PAFSCtrl=AFSCtrlMax is established. Therefore, by extending the plot L10, a straight line with an inclination of AFSCtrlMax is obtained as indicated by broken line L11. Thus the wobbling operation can be correctly performed.

Figure 4:
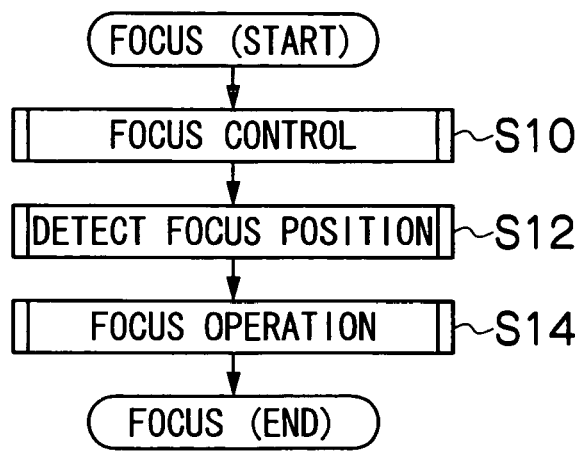
FIG. 4 is a flowchart showing the flow of focus control.
Figure 5:
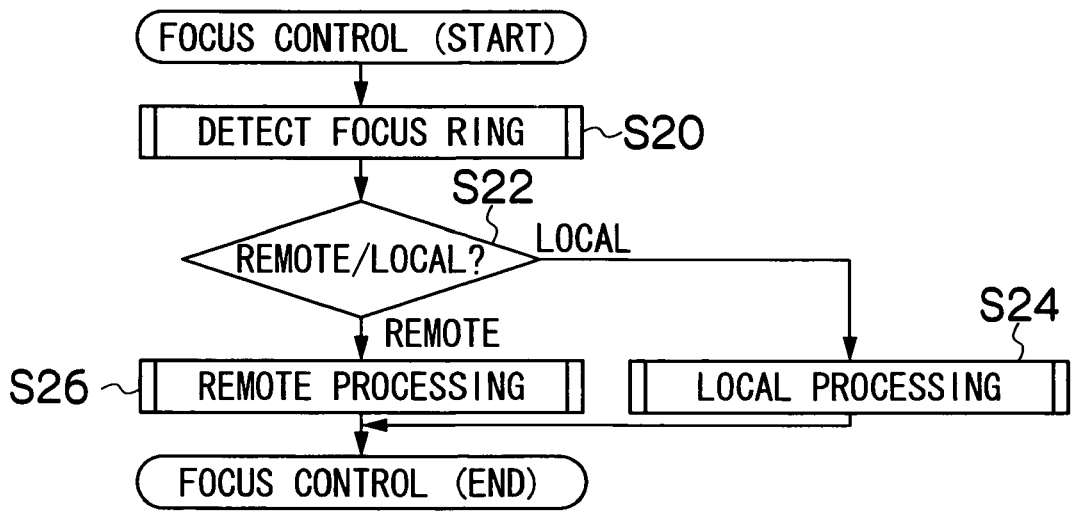
FIG. 5 is a flowchart showing a focus control process of FIG. 4.
Figure 6:
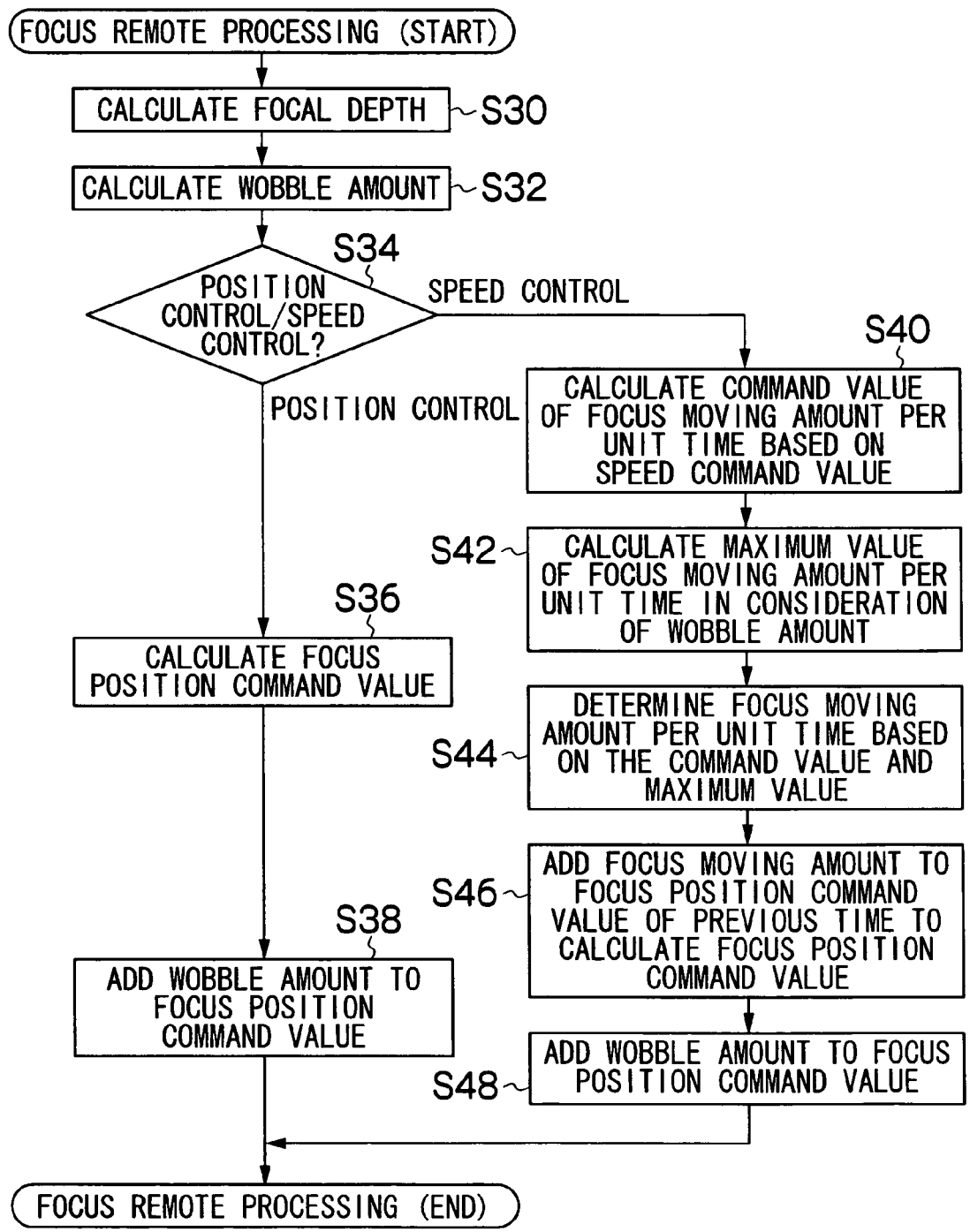
FIG. 6 is a flowchart showing the process of remote processing of FIG. 5.

Referring to FIGS. 4 to 6, focus control of the present embodiment will be discussed below. FIG. 4 is a flowchart showing the flow of focus control. First, in response to a manual operation (local position command LP) from the focus manual operation section 22 or a remote command (remote position command RP or remote speed command RS) from the camera 12, the focus position command value FPCtrlOP is calculated (focus control: step S10). Then, the position detection section 44 detects the positions of the focus lenses FL (step S12). Then, the focus position control section 62 calculates the amounts of movement or the like of the focus lenses FL based on the focus position command value FPCtrlOP and position data on the focus lenses FL, the position data being inputted from the position detection section 44. After that, the focus position control section 62 outputs the focus control signal including the data on the amounts of movement to the focus drive section 40. The focus lenses FL are driven by the focus drive section 40 and wobbled around the focus position command value FPCtrl by |Wob|. Thus the best focus position is detected by the camera control microcomputer 16 and the focus lenses FL are moved to the best focus position (focus operation: step S14).

FIG. 5 is a flowchart showing the focus control process of FIG. 4. First, it is detected whether an input operation is performed by the focus manual operation section 22 (focus ring) (step S20). The lens control microcomputer 18 always detects the operation of the focus ring in response to a signal from the counter 26. When the operation of the focus ring is detected (local in step S22), focus is manually controlled based on the local position command LP (local processing: step S24). On the other hand, when the operation of the focus ring is not detected and the remote position command RP or the remote speed command RS is received from the camera 12 (remote in step S22), focus is remotely controlled based on the remote position command RP or the remote speed command RS (remote processing: step S26).

FIG. 6 is a flowchart showing the process of the remote processing of FIG. 5. First, the lens control microcomputer 18 calculates the focal depth d of the lens device 14 according to Equation (1) (step S30). Further, the wobbling command section 64 obtains the wobble movement amount command value WobCtrl from the Wobble command W inputted from the camera 12 and calculates the wobble amount Wob according to Equation (2) (step S32).

Then, in the case of focus control responding to the remote position command RP from the camera 12 (position control of step S34), the focus position command section 60 calculates the focus position command value FPCtrl in response to the remote position command RP inputted from the camera 12 (step S36). After that, as expressed in Equation (3), the focus position command section 60 adds the wobble amount Wob to the focus position command value FPCtrl to calculate the focus position command value FPCtrlOP in consideration of the wobble amount Wob (step S38). Thus based on the remote position command RP, the focus position command value FPCtrlOP is calculated in consideration of the wobble amount Wob.

On the other hand, in the case of focus control responding to the remote speed command RS from the camera 12 (speed control in step S34), the lens control microcomputer 18 obtains, from the remote speed command RS inputted from the camera 12, a command to move the focus lenses FL at the speed AFSpeedCtrl which is a times as large as the focal depth d per unit time. Then, the integral calculating section 66 integrates the speed AFSpeedCtrl to calculate the movement amount command values LAFSCtrl of the focus lenses FL per unit time (for example, 1 ms) (step S40).

Then, the focus position command section 60 calculates the maximum value AFSCtrlMax of the amounts of movement of the focus lenses FL per unit time in consideration of the calculated wobble amount Wob (step S42). Then, based on the command value LAFSCtrl and the maximum value AFSCtrlMax, the moving amount PAFSCtrl of the focus lenses FL is determined per unit time (step S44). In step S44, when the command value LAFSCtrl is larger than or equal to the maximum value AFSCtrlMax (LAFSCtrl≧AFSCtrlMax), PAFSCtrl=AFSCtrlMax is established. When the command value LAFSCtrl is smaller than the maximum value AFSCtrlMax (LAFSCtrl<AFSCtrlMax), PAFSCtrl=LAFSCtrl is established.

Then, as expressed in Equation (4), the moving amount PAFSCtrl is added to the focus position command value AFSCtrl of the previous processing (or the initial positions of the focus lenses FL) to calculated the focus position command value AFSCtrl (step S46). After that, the wobble amount Wob is added to the value of AFSCtrl having been obtained by Equation (4) (see Equation (5)), so that the focus position command value FPCtrlOP is calculated in consideration of the wobble amount Wob (step S48). Thus based on the remote speed command RS, the focus position command value FPCtrlOP is calculated in consideration of the wobble amount Wob.

In the camera system 10 of the present embodiment, focus control is performed by the lens control microcomputer 18 of the lens device 14. The focus lenses FL may be directly controlled by the camera control microcomputer 16.

In the case where focusing and zooming are simultaneously performed in the present embodiment, the maximum value AFSCtrlMax may be set according to the zoom positions of the zoom lenses ZL.

What is claimed is:

1. A camera system, comprising:
    an imaging optical system including a focus lens,
    a driving device which drives the focus lens,
    a moving speed command value input device which inputs a moving speed command value of the focus lens,
    a wobble amount calculating device which calculates a wobble amount for wobbling the focus lens,
    a moving amount command value calculating device which calculates a command value of an amount of movement of the focus lens per unit time based on the inputted moving speed command value,
    a moving amount maximum value calculating device which calculates a maximum value of the amount of movement of the focus lens per unit time in consideration of the wobble amount,
    a moving amount determining device which sets, when the command value is larger than or equal to the maximum value, the maximum value as the amount of movement of the focus lens per unit time, and sets, when the command value is smaller than the maximum value, the command value as the amount of movement of the focus lens per unit time,
    a focus position command value calculating device which calculates a focus position command value based on the determined amount of movement of the focus lens per unit time,
    a best focus direction detecting device which detects a best focus direction when the focus lens is driven to a position of the focus position command value by the driving device while wobbling, and
    a control device which moves the focus lens to the best focus position based on the detected best focus direction.

2. The camera system according to claim 1, further comprising: a focal depth calculating device which calculates a focal depth of the imaging optical system,
    wherein the wobbling amount calculating device calculates the wobble amount based on the focal depth.

* * * * *